US008682143B2

(12) United States Patent
Takagi

(10) Patent No.: US 8,682,143 B2
(45) Date of Patent: Mar. 25, 2014

(54) MOVING IMAGE PROCESSING APPARATUS, MOVING IMAGE PROCESSING METHOD, AND PROGRAM

(75) Inventor: Yoshinori Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 44 days.

(21) Appl. No.: 13/197,029

(22) Filed: Aug. 3, 2011

(65) Prior Publication Data
US 2012/0039584 A1 Feb. 16, 2012

(30) Foreign Application Priority Data
Aug. 10, 2010 (JP) ................ P2010-179694

(51) Int. Cl.
G11B 27/00 (2006.01)
H04N 5/93 (2006.01)
H04N 5/92 (2006.01)
G06K 9/34 (2006.01)
G06K 9/62 (2006.01)
H04N 7/14 (2006.01)
H04N 7/18 (2006.01)

(52) U.S. Cl.
USPC ........... 386/278; 386/280; 386/282; 386/283; 386/326; 386/353; 382/171; 382/224; 348/14.07; 348/14.03; 348/135

(58) Field of Classification Search
USPC ............... 386/278, 280, 282, 283, 326, 353; 348/14.07, 14.03, 135; 382/171, 224
See application file for complete search history.

(56) References Cited

U.S. PATENT DOCUMENTS

| 7,203,366 B2 * | 4/2007 | Miyatake et al. ............. 382/190 |
| 2005/0180580 A1 * | 8/2005 | Murabayashi et al. ......... 381/81 |
| 2007/0112558 A1 | 5/2007 | Kobayashi |
| 2010/0094782 A1 | 4/2010 | Kobayashi |
| 2010/0182501 A1 * | 7/2010 | Sato et al. ..................... 348/441 |
| 2011/0249956 A1 * | 10/2011 | Komai .......................... 386/248 |

FOREIGN PATENT DOCUMENTS

| JP | 2007 121457 | 5/2007 | |
| JP | 2008 123011 | 5/2008 | |
| WO | WO 2010073355 A1 * | 7/2010 | ............... H04N 5/76 |

* cited by examiner

Primary Examiner — Daquan Zhao
(74) Attorney, Agent, or Firm — Sony Corporation

(57) ABSTRACT

Provided is a moving image processing apparatus including a cut transition detection unit configured to detect inter-cut transition from a moving image including a plurality of cuts; a cut pair specifying unit configured to specify cut pairs repeated as a series of different cuts based on a feature amount of each cut; and a cut structure image generation unit configured to generate a cut structure image including a representative image of each cut arranged in an order of the cut transition and indicating a boundary between the cut pairs.

20 Claims, 15 Drawing Sheets

FIG.1
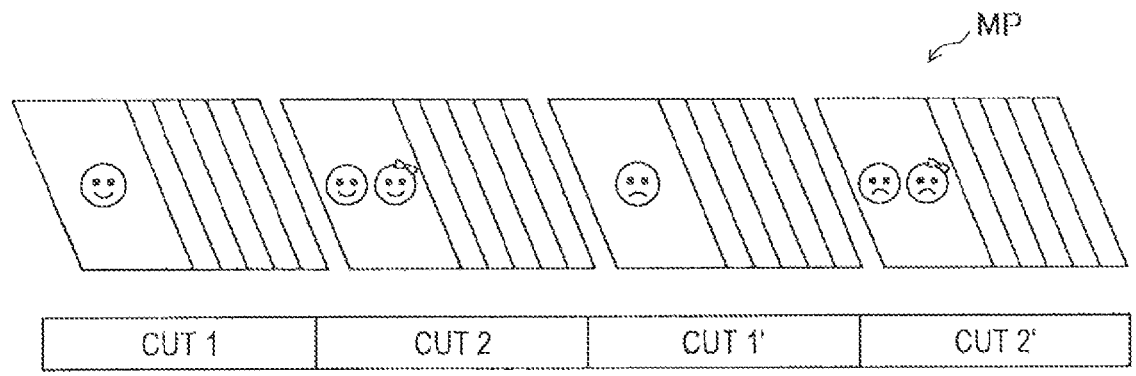
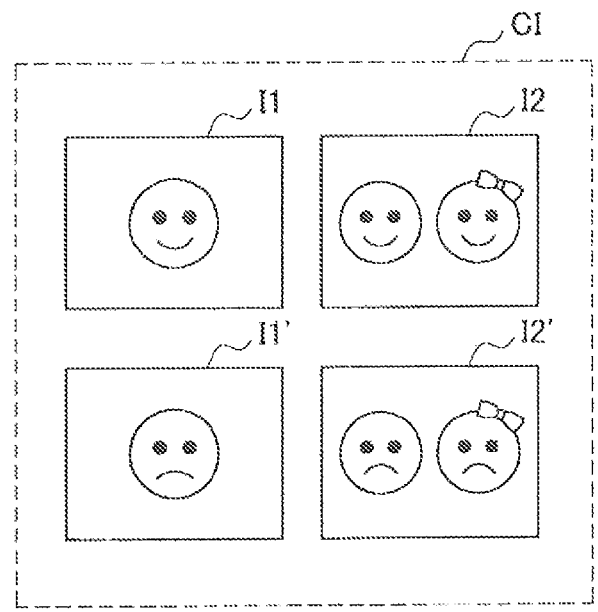

| CUT ID | CUT GROUP ID | CUT PAIR ID |
|--------|--------------|-------------|
| 1 | 1 | 1 |
| 2 | 2 | 1 |
| 3 | 1 | 2 |
| 4 | 2 | 2 |
| 5 | 3 | 2 |
| 6 | 1 | 3 |
| 7 | 2 | 3 |

FIG.8
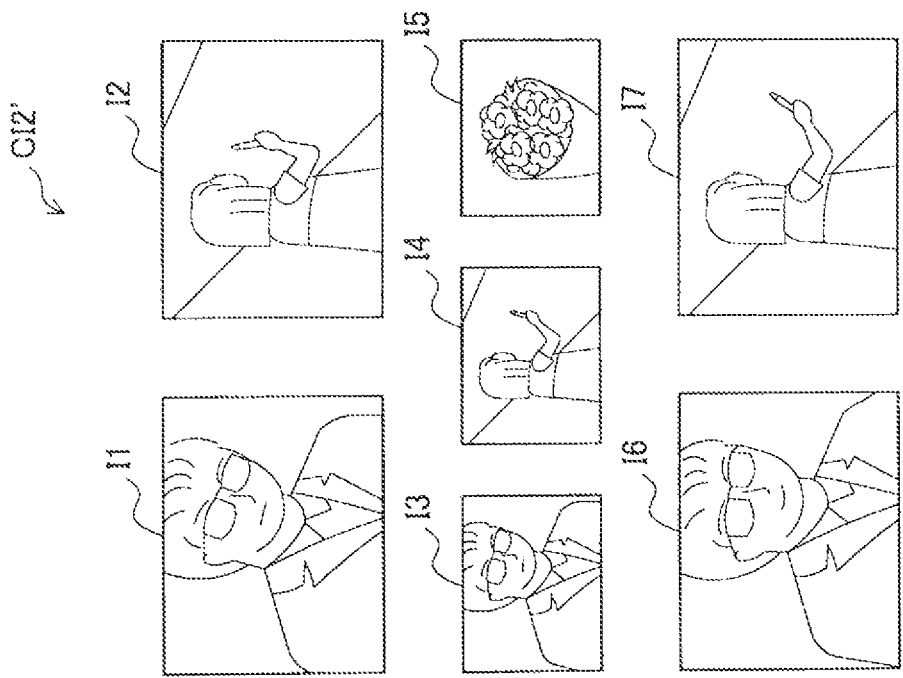
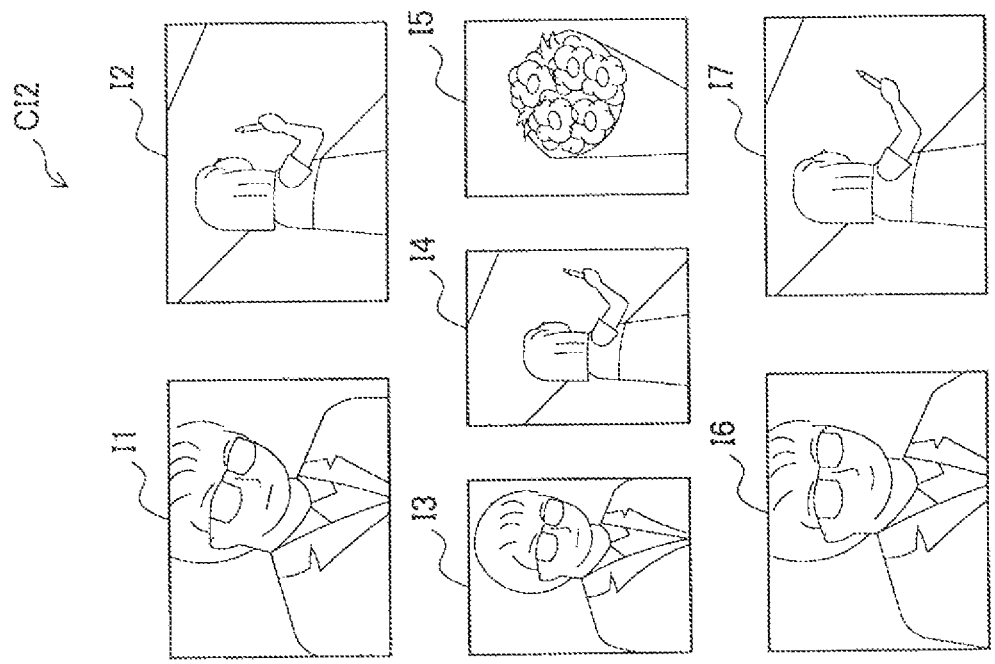

MOVING IMAGE PROCESSING APPARATUS, MOVING IMAGE PROCESSING METHOD, AND PROGRAM

BACKGROUND

The present disclosure relates to a moving image processing apparatus, a moving image processing method, and a program.

In general, a video (or a moving image) includes a plurality of cuts. In the related art, in order to understand the cut structure of a video, a moving image processing method has been disclosed to arrange and display thumbnails of the video chronologically at a constant frame interval. The moving image processing method can provide information on the object of a video.

SUMMARY

Further, in video expression, there is a case in which a cut structure is devised such as the repetition (also referred to as turning of cuts) of a series of different cuts according to the intention of a maker. However, the moving image processing method in the related art provides the information on the object of the video, but does not sufficiently provide information on a method of capturing the object of the video, in other words, information on a method of expressing the video in relation to the temporal context of the video.

Meanwhile, there is a case in which the method of expressing the video in relation to the temporal context of the video may be important to a person who views a video or a person who uses the video as a material of other videos and the like. However, since it is not possible for the moving image processing method in the related art to sufficiently provide such information, a viewer or a user may not intuitively understand the cut structure of the video.

In light of the foregoing, it is desirable to provide a moving image processing apparatus, a moving image processing method, and a program, which enable the cut structure of a moving image to be easily understood.

According to an embodiment of the present disclosure, there is provided a moving image processing apparatus including a cut transition detection unit configured to detect inter-cut transition from a Moving image including a plurality of cuts; a cut pair specifying unit configured to specify cut pairs repeated as a series of different cuts based on a feature amount of each cut; and a cut structure image generation unit configured to generate a cut structure image including a representative image of each cut arranged in an order of the cut transition and indicating a boundary between the cut pairs.

The cut structure image may include meta information indicating a feature of each cut.

The meta information may indicate a feature of voice included in each cut.

The meta information may indicate content of voice included in each cut.

The meta information may indicate that no voice is included in each cut.

The cut structure image may include the meta information indicating a change in the feature of the voice included in each cut.

The cut structure image may include the meta information indicating a difference between a feature of voice included in one cut and a feature of voice included in a similar cut belonging to the cut pair which is different from the cut.

The meta information may indicate a feature of an image included in each cut.

The meta information may indicate the number of frames included in each cut.

The cut structure image may include the meta information indicating a change in the feature of the image included in each cut.

The cut structure image may include the meta information indicating a difference between a feature of an image included in one cut and a feature of an image included in a similar cut belonging to the cut pair which is different from the cut.

The cut structure image may include the meta information superimposed on the representative image of each cut.

The cut structure image may include the meta information superimposed on an area where no specific image is displayed among areas of the representative images.

The cut structure image may indicate the boundary between the cut pairs, through line feed of a display position.

The cut structure image may show the representative image of each cut to be aligned with a display position of the representative image of a similar cut belonging to the out pair which is different from the cut.

According to an embodiment of the present disclosure, there is provided a moving image processing method including detecting inter-cut transition from a moving image including a plurality of cuts; specifying cut pairs repeated as a series of different cuts based on a feature amount of each cut; and generating a cut structure image including a representative image of each cut arranged in an order of the cut transition and indicating a boundary between the cut pairs.

According to an embodiment of the, present disclosure, there is provided a program causing a computer to execute a moving image processing method, the method including detecting inter-cut transition from a moving image including a plurality of cuts; specifying cut pairs repeated as a series of different cuts based on a feature amount of each cut; and generating a cut structure image including a representative image of each cut arranged in an order of the cut transition and indicating a boundary between the cut pairs.

According to the embodiments of the present disclosure described above, it is possible to provide a moving image processing apparatus, a moving image processing method, and a program, which enable the cut structure of a moving image to be easily understood.

BRIEF DESCRIPTION OF THE DRAWINGS

FIG. 1 is a diagram explaining the overview of a moving image processing method according to an embodiment of the present disclosure;

FIG. 8 is a diagram illustrating a modified example of the cut structure image illustrated in FIG. 7;

DETAILED DESCRIPTION OF THE EMBODIMENT(S)

Figure 2:
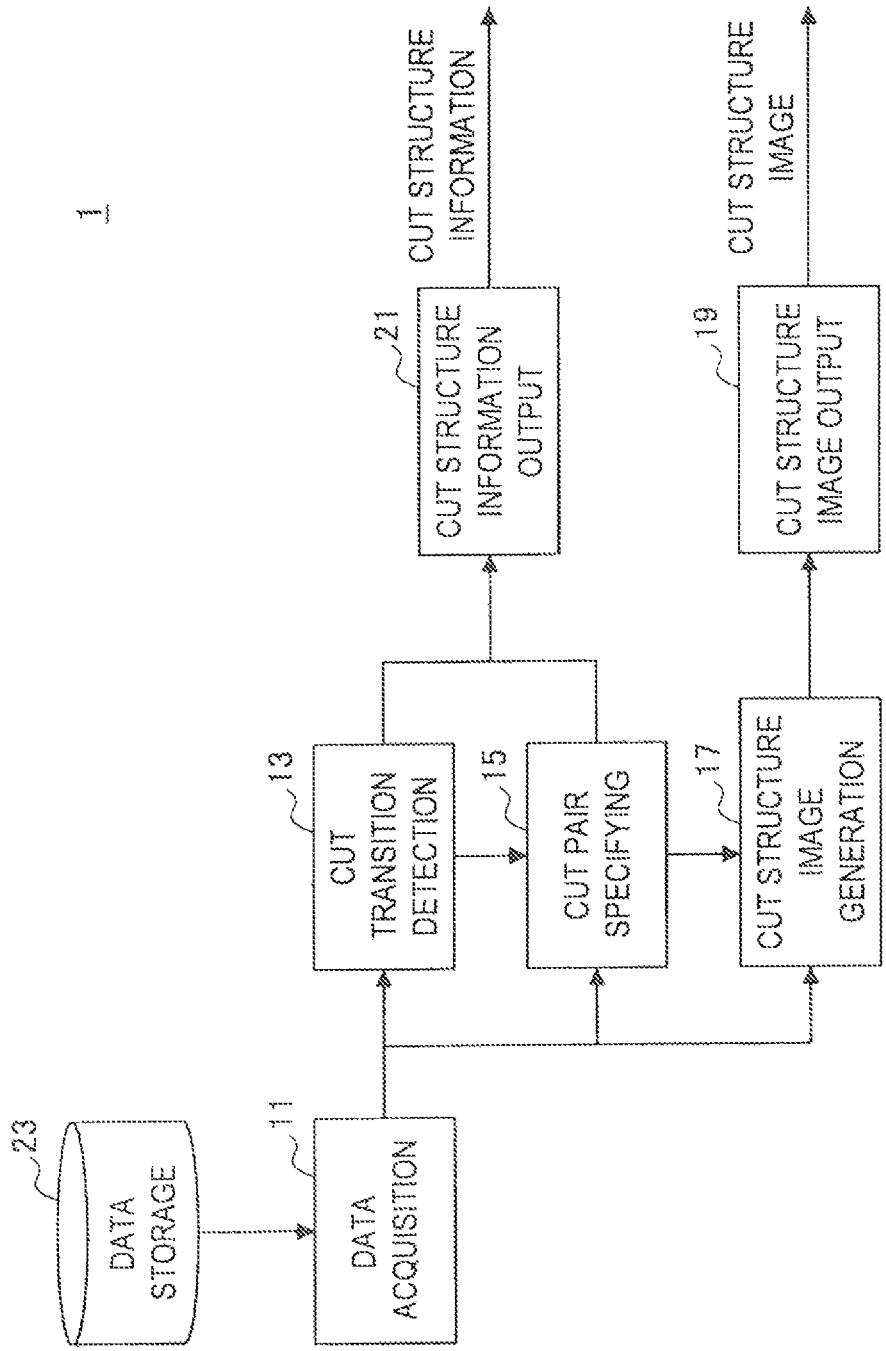
FIG. 2 is a block diagram illustrating the configuration of a moving image processing apparatus according to a first embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

[1. Overview of Moving Image Processing Method]

First, the overview of a moving image processing method according to an embodiment of the present disclosure will be described with reference to FIG. 1. FIG. 1 illustrates the overview of the moving image processing method.

In the moving image processing method according to the embodiment of the present disclosure, inter-cut transition is first detected from a moving image MP including a plurality of cuts. Next, cut pairs repeated as a series of different cuts are specified based on a feature amount S (the general term for feature amounts of cuts) of each cut. Then, a cut structure image CI (the general term for cut structure images) including a representative image I (the general term for representative images) of each cut arranged in the order of cut transition and indicating the boundary between cut pairs is generated. The cut structure image CI is output through moving image processing apparatuses 1 and 2 (to be described later) or an external apparatus as information for easily understanding the cut structure of the moving image MP.

For example, in a cut structure including cuts 1 and 2, a cut 1' similar to the cut 1, a cut 2' similar to the cut 2 and the like, the cut pair represents the combination of the cuts 1 and 2 and the combination of the cuts 1' and 2', which are repeated. In addition, in a cut structure including cuts 1, 2, 1', 2' and 3, a cut 1" similar to the cut 1 and, 1', a cut 2" similar to the cut 2 and 2' and the like; the cut pair also represents the combination of the cuts 1', 2' and 3. The repetition of the cut pair is subject to video expression as the turning of cuts.

In the example illustrated in FIG. 1, the cut structure image CI is generated from the moving image MP with the cut structure including the cuts 1, 2, 1', 2' and the like. In the cut structure image CI, representative images I1 and I2 of the cuts 1 and 2 are transversely arranged, and representative images I1' and I2' of the cuts 1' and 2' are transversely arranged below the representative images. Consequently, it is apparent that the cuts 1 and 2 and the cuts 1' and 2' form cut pairs, respectively.

In this way, information on a method of expressing a video in relation to the temporal context of the video is provided using the cut structure image CI. Consequently, a viewer or a user of the video views the video or uses the video as a material of other videos and the like, thereby easily understanding the cut structure of the video.

<First Embodiment>

[2-1. Configuration of Moving Image Processing Apparatus 1]

Next, the moving image processing apparatus 1 according to the first embodiment of the present disclosure will be described with reference to FIG. 2. FIG. 2 illustrates the main functional configuration of the moving image processing apparatus 1. As illustrated in FIG. 2, the moving image processing apparatus 1 includes a data acquisition unit 11, a cut transition detection unit 13, a cut pair specifying unit 15, a cut structure image generation unit 17, a cut structure image output unit 19, a cut structure information output unit 21, and a data storage unit 23.

The data acquisition unit 11 acquires moving image data MP including a plurality of cuts, and supplies the moving image data MP to the cut transition detection unit 13, the cut pair specifying unit 15, and the cut structure image generation unit 17. In general, the moving image data MP is data in a frame format, and may be only image data or a combination of image data and voice data. The moving image data MP may be acquired from the data storage unit 23 or an external apparatus (not shown).

The cut transition detection unit 13 detects cut transition in a moving image MP based on the moving image data MP, and supplies the detection result to the cut pair specifying unit 15 and the cut structure information output unit 21. The cut transition represents a change in cuts in the moving image MP. The cut transition is detected based on the degree of the similarity of obtained feature amounts of images and/or voice in frames in succession. As the feature amounts of the images and/or the voice, a color histogram and facial image detection, and/or the volume, tone/rhythm and the like of voice can be used. In addition, feature amounts obtained when detecting the cut transition may be stored in the data storage unit 23 and the like and used for other processes.

The cut pair specifying unit 15 groups a plurality of cuts into cut groups based on the feature amount S of each cut, and specifies cut pairs, which will be described in detail later. The specifying result of the cut pairs is supplied to the cut structure image generation unit 17 and the cut structure information output unit 21 together with the detection result of the cut transition. As the feature amounts S of the cut; a color histogram and facial image detection of an image included in the cut, and/or the volume, tone/rhythm and the like of voice or a combination thereof can be used. In addition, feature amounts obtained when specifying the cut pairs may be stored in the data storage unit 23 and the like and used for other processes.

The cut group represents a combination of cuts having feature amounts S similar to each other, and, the cut pair represents a combination of a series of different cuts repeated in a cut structure, and includes two or more cuts being temporally continued. The cut pair specifying unit 15 assigns attribute information (a group ID and a pair ID which will be described later) representing a cut, group or a cut pair to each cut based on the specifying result of the cut pairs. The attribute information may be supplied to the cut, structure information output unit 21, the data storage unit 23, an external apparatus and the like, in addition to the cut structure image generation unit 17.

In order to generate the cut structure image CI, the cut structure image generation unit 17 extracts a representative image I from images included in each cut based on the moving image data MP and the detection result of the cut transition according to predetermined standards. The representative image I is an image representing each cut, and for example, is extracted as an image corresponding, to a center frame of the cut. The cut structure image CI is generated as an image including the representative images I of a plurality of cuts arranged in the order of the cut transition and indicating the boundary between cut pairs, and is supplied to the cut structure image output unit 19.

The cut structure image output unit 19 outputs the cut structure image CI supplied from the cut structure image generation unit 17 such that a user can understand the cut structure of the moving image MP. The cut structure image CI may be output to a display apparatus, a printing apparatus, a storage apparatus, or an external apparatus (not shown) connected to the moving image processing apparatus 1.

The cut structure information output unit 21 outputs the detection result of the cut transition, the grouping result of the cuts, and the specifying result of the cut pairs as cut structure information such that a user can use the cut structure information to understand the cut structure. The cut structure information may be output to the display apparatus; the printing apparatus, the storage apparatus, or the external apparatus (not shown) connected to the moving image processing apparatus 1.

The cut structure information, for example, may be used as data for performing a moving image search considering the cut structure. For example, a certain cut can be used as a reference cut, and a cut forming a cut pair together with the reference cut can be searched, or a certain cut pair can be used as a reference cut pair, and a cut pair with the same structure as that of the reference cut pair can be searched. Furthermore, it is possible to search the moving image MP including a large number of cut pairs or the moving image MP including a large number of cut turnings.

The data storage unit 23 stores the moving image data MP and data belonging to the moving image data MP. The data storage unit 23 stores the cut structure information associated with the moving image data MP. In addition, the data storage unit 23 may store the cut structure image CI. Furthermore, in FIG. 2, a part of a connection relationship between the data storage unit 23 and other elements is omitted.

Here, in the functional configuration, the data acquisition unit 11, the cut transition detection unit 13, the cut pair specifying unit 15, the cut structure image generation unit 17, the cut structure image output unit 19, and the cut structure information output unit 21 include an arithmetic processing unit such as a CPU or a digital signal processing apparatus (DSP). The data storage unit 23 includes an internal storage device such as a flash memory, or an external storage device such as a hard disk drive or a Blu-ray disc drive. The CPU develops and executes a program read from a ROM and the like on a RAM, thereby performing a moving image processing method. In addition, at least a part of the functional configuration may be realized by hardware such as a dedicated logic.

[2-2. Operation of Moving Image Processing Apparatus 1]

Figure 3:
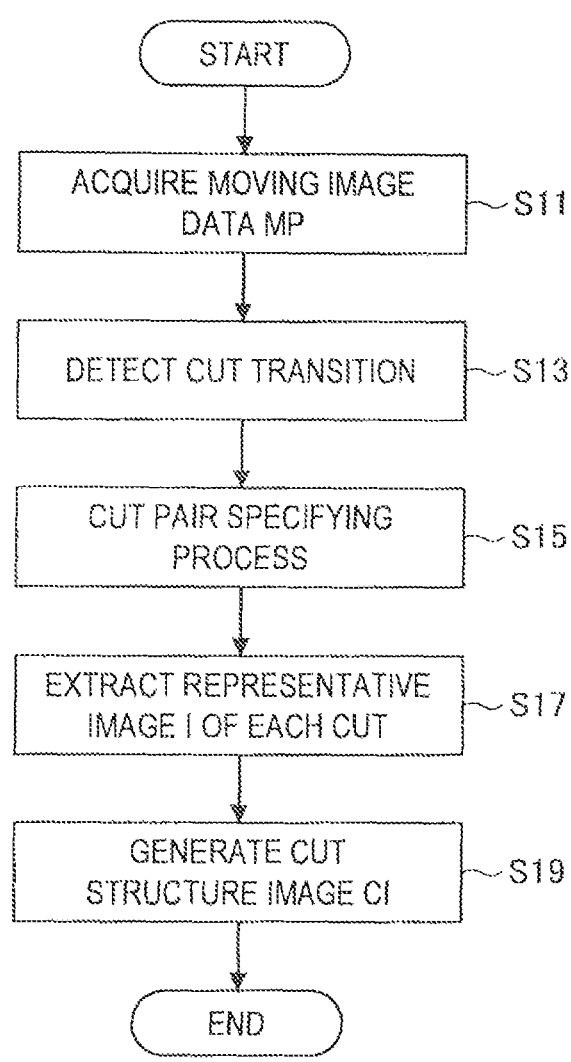
FIG. 3 is a flowchart illustrating the operation procedure of a moving image processing apparatus.

Next, the operation of the moving image processing apparatus 1 according to the first embodiment will be described with reference to FIGS. 3 to 9. FIG. 3 illustrates the operation procedure of the moving image processing apparatus 1.

As illustrated in FIG. 3, the data acquisition unit 11 first acquires moving image data MP (step S11) and supplies the moving image data MP to the cut transition detection unit 13 and the like. The cut transition detection unit 13 detects cut transition in a moving image MP based on the moving image data MP (step S13), and supplies the detection result to the cut pair specifying unit 15. The cut transition is detected based on the degree of similarity of the feature amounts of images and/or voice in frames in succession. A serial number indicating the order of the cut transition is assigned to each cut as a cut ID.

Figure 4:
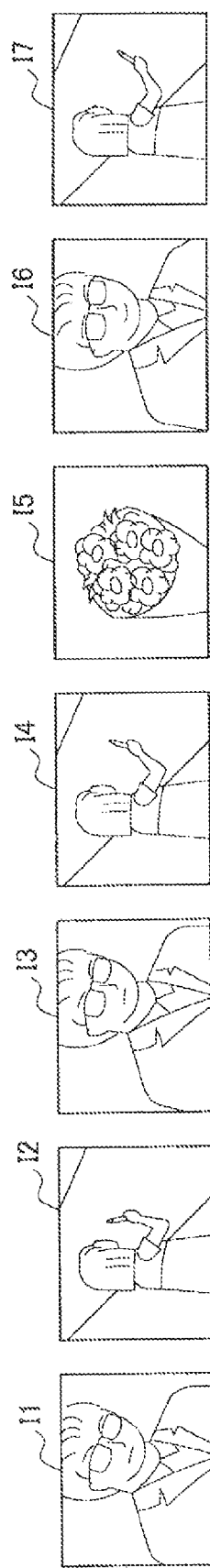
FIG. 4 is a diagram illustrating an example of a cut structure.

FIG. 4 illustrates an example of a cut structure obtained from the detection result of the cut transition. In order to facilitate understanding, FIG. 4 illustrates a cut structure using representative images I1 to I7 of cuts 1 to 7. In addition, the representative images I are extracted by the cut structure image generation unit 17 from the moving image data MP as will be described later. As illustrated in FIG. 4, cuts 1, 3 and 6 are similar to one another, cuts 2, 4 and 7 are similar to one another, and a cut 5 is not similar to any of the cuts 1 to 4, 6 and 7.

Figure 5:
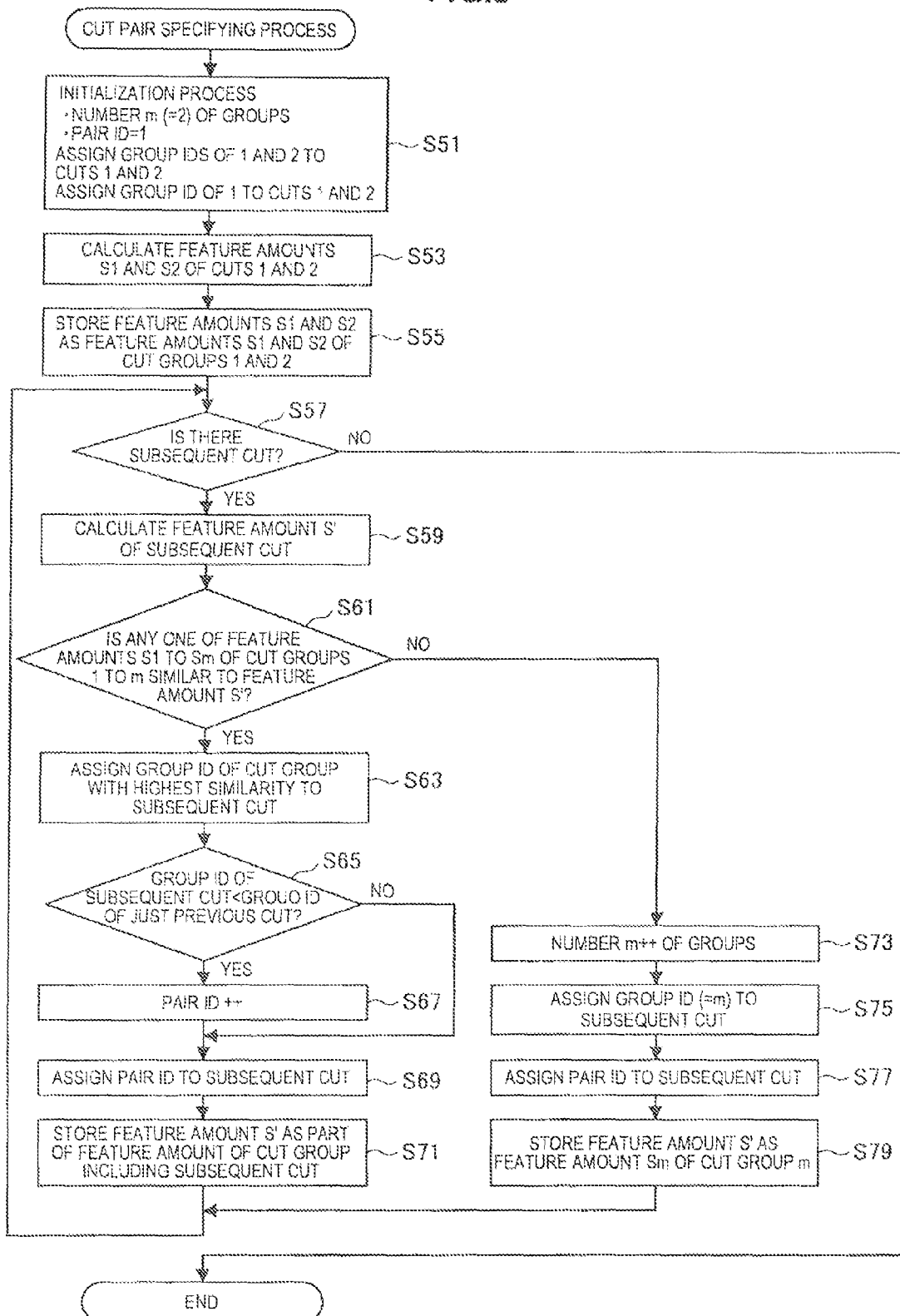
FIG. 5 is a flowchart illustrating the procedure of a cut pair specifying process.

Next, the cut pair specifying unit 15 groups the cuts into cut groups and performs a cut pair specifying process for specifying cut pairs. FIG. 5 illustrates the procedure of the cut pair specifying process. As illustrated in FIG. 5, in the cut pair specifying process, an initialization process is first performed (step S51). In the initialization process, the number m of groups and a pair ID are initialized (m=2 and the pair ID=1). Furthermore, a group ID of 1 is assigned to the cut 1, a group ID of 2 is assigned to the cut 2, and a pair ID of 1 is assigned to the cuts 1 and 2.

Here, the number m of groups indicates the number of cut groups (cut groups 1 and 2 are specified in the initialization process) specified from the moving image data MP. The group ID and the pair ID are assigned to each cut in order to represent cut groups and cut pairs to which each cut belongs.

Then, feature amounts S1 and S2 of the cuts 1 and 2 are calculated (step S53) and stored in the data storage unit 23 and the like as the feature amounts of the cut groups 1 and 2 (step S55). The feature amounts S (the general term for the feature amounts of the cut or the cut group) of the cut are calculated as a color histogram and facial image detection, and/or the volume, tone/rhythm and the like of voice, or a combination thereof.

Next, the presence or absence of a subsequent cut to be processed is checked (step S57). When the subsequent cut is present ("Yes" in step S57), the feature amounts S' of the subsequent cut are calculated (step S59), and the similarity of the feature amounts S is determined between the subsequent cut and cut groups 1 to m (step S61). Here, when performing the determination, the degree of the similarity of the feature amounts S may be preferentially determined between, the subsequent cut and a cut group with a group ID larger than that of an immediately previous cut. This is because the group ID of a cut group including the subsequent but is larger than that of the immediately previous cut when they belong to the same cut pair.

When the degree of the similarity of the feature amounts S is equal to or more than a predetermined threshold value between the subsequent cut and any one of the cut groups 1 to m ("Yes" in step S61), the group ID of a cut group with the highest similarity is assigned to the subsequent cut (step S63).

Furthermore, the group ID of the subsequent cut is compared with the group ID of the immediately previous cut (step S65). When the group ID of the subsequent cut is smaller than the group ID of the immediately previous cut, the pair ID is incremented by 1 (step S67). In such a case, the immediately previous cut and the subsequent cut belong to different cut pairs, and a boundary (a turning point of cuts) between the cut pairs is between the two cuts. A previous pair ID or an incremented pair ID is assigned to the subsequent cut (step S69). The feature amounts S of the subsequent cut may be stored as a part of the feature amounts S of the cut group including the subsequent cut, and then used or discarded (step S71).

Meanwhile, when the degree of the similarity of the feature amounts S is smaller than the predetermined threshold value between the subsequent cut and all the cut groups 1 to m ("No" in step S61), the number m of the groups is incremented by 1 in order to generate a new cut group (step S73). A group ID corresponding to the number m of the groups is assigned to the subsequent cut as the new cut group (step S75). Furthermore, the previous pair ID is assigned to the subsequent cut (step S77). The feature amounts S of the subsequent cut is stored as the feature amounts Sm of the new cut group including the subsequent cut, and then used (step S79).

The processes of steps S57, S59, S61, S63, S65, S67, S69, S71, S73, S75, S77, and S79 are repeated until there is no subsequent cut. ("No" in step S57). When there is no subsequent cut, the cut pair specifying process ends, and the process of the next step S17 is performed as illustrated in FIG. 3.

Figure 6:
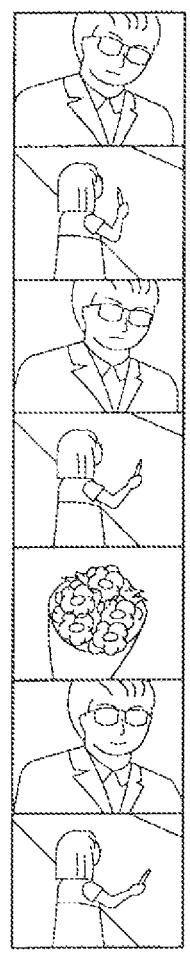
FIG. 6 is a table illustrating a specifying result of cut pairs included in the cut structure illustrated in FIG. 4.

FIG. 6 illustrates the specifying result of the cut pairs included in the cut structure illustrated in FIG. 4. As illustrated in FIG. 6, a group ID of 1 is assigned to the cuts 1, 3 and 6, a group ID of 2 is assigned to the cuts 2, 4 and 7, and a group ID of 3 is assigned to the cut 5 based on the degree of the similarity of the feature amount S of each cut. Furthermore, a pair ID of 1 is assigned to the cuts 1 and 2, a pair ID of 2 is assigned to the cuts 3 to 5, and a pair ID of 3 is assigned to the cuts 6 and 7 based on the order of the cut transition. That is, the cuts 1 and 2, the cuts 3 to 5, and the cuts 6 and 7 are specified as cut pairs, which are repeated as a series or different cuts, respectively.

The cut structure image generation unit 17 first extracts the representative images I from a series of images included in each cut based on the moving image data MP and the detection result of the cut transition according to predetermined standards (step S17). In addition, the representative image I of each cut may be extracted in advance when the cut transition is detected. Next, the cut structure image CI is generated based on the specifying result of the cut pairs (step S19). As described above, the cut structure image CI is generated as an image including the representative image I of each cut arranged in the order of the cut transition and indicating the boundary between the cut pairs.

Figure 7:
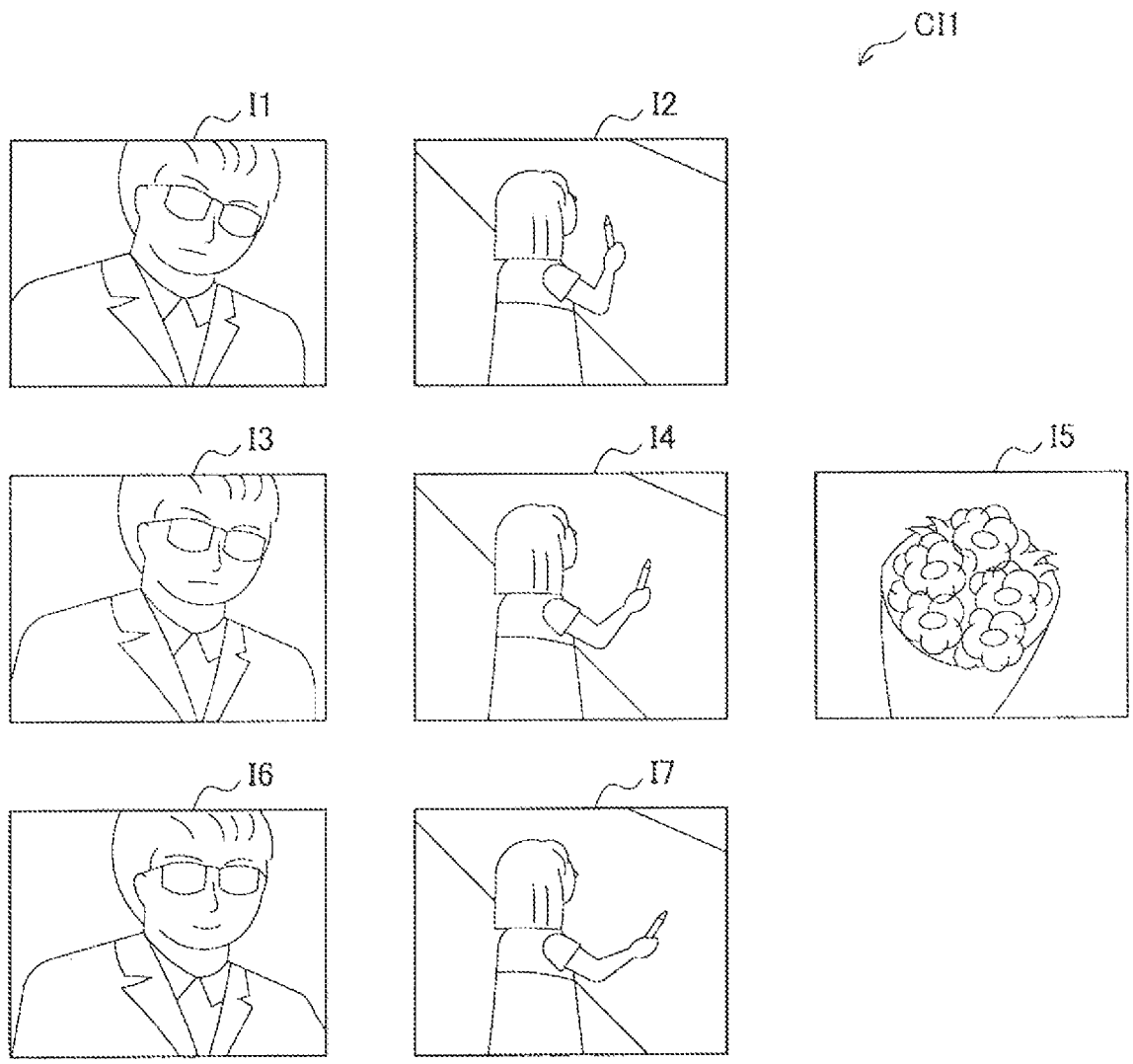
FIG. 7 is a diagram illustrating an example of a cut structure image generated from the specifying result of the cut pairs illustrated in FIG. 5.

FIG. 7 illustrates an example of the cut structure image CI generated from the specifying result of the cut pairs illustrated in FIG. 6. In the cut structure image CI1 illustrated in FIG. 7, the representative images I1 and I2 of the cuts 1 and 2 are transversely arranged, the representative images I3 to I5 of the cuts 3 to 5 are transversely arranged below the representative images I1 and I2 of the cuts 1 and 2, and the representative images I6 and I7 of the cuts 6 and 7 are transversely arranged below the representative images I3 and I4 of the cuts 3 and 4. That is, the representative images I1 to I7 of the cuts 1 to 7 are arranged in a matrix format in which cut groups are employed as transverse parameters and cut pairs are employed as longitudinal parameters.

FIG. 8 illustrates a modified example of the cut structure image CI illustrated in FIG. 7. In the cut structure image CI1 illustrated in FIG. 7, the representative image of each cut are arranged with the same size. Meanwhile, in the cut structure images CI2 and CI2' illustrated in FIG. 8, sizes of the representative images I3 to I5 are adjusted in order to adjust the total size of the cut structure image CI. In the example illustrated in FIG. 8, in order to allow the display widths of the cut pairs to coincide with one another, the sizes of the representative images I3 to I5 of the cuts 3 to 5 are reduced only in the transverse direction (the cut structure image CI2) or reduced in the longitudinal and transverse directions (the cut structure image CI2').

Figure 9:
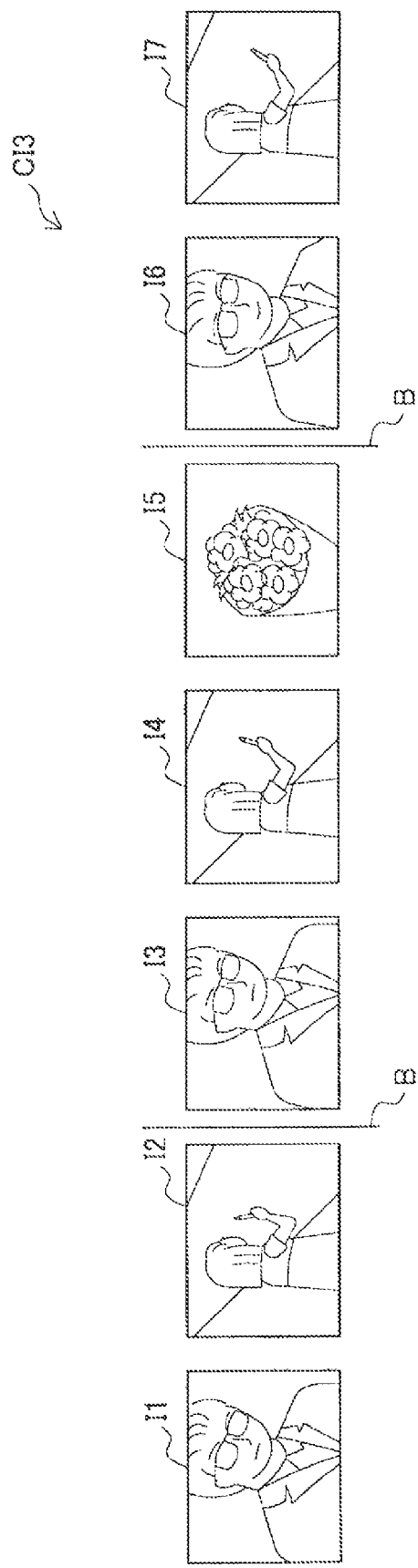
FIG. 9 is a diagram illustrating another example of a cut structure image.

FIG. 9 illustrates another example of the cut structure image CI. In the cut structure image CI3 illustrated in FIG. 9, instead of arranging the representative images I in the matrix format, the representative images I are arranged in a row in the transverse direction together with information indicating the boundaries between the cut pairs. In the example illustrated in FIG. 9, the representative images I1 and I2 of the cuts 1 and 2, the representative images I3 to I5 of the cuts 3 to 5, and the representative images I6 and I7 of the cuts 6 and 7 are transversely arranged together with lines B indicating the boundaries between the cut pairs.

[2-3. Conclusion]

As described above, in accordance with the moving image processing apparatus 1 according to the first embodiment of the present disclosure, information on a method of expressing a video in relation to the temporal context of the video is provided using the cut structure image CI. Consequently, a viewer or a user of the video views the video or uses the, video as a material of other videos and the like, thereby easily understanding the cut structure of the video.

<Second Embodiment>

[3-1. Configuration of Moving Image Processing Apparatus 2]

Figure 10:
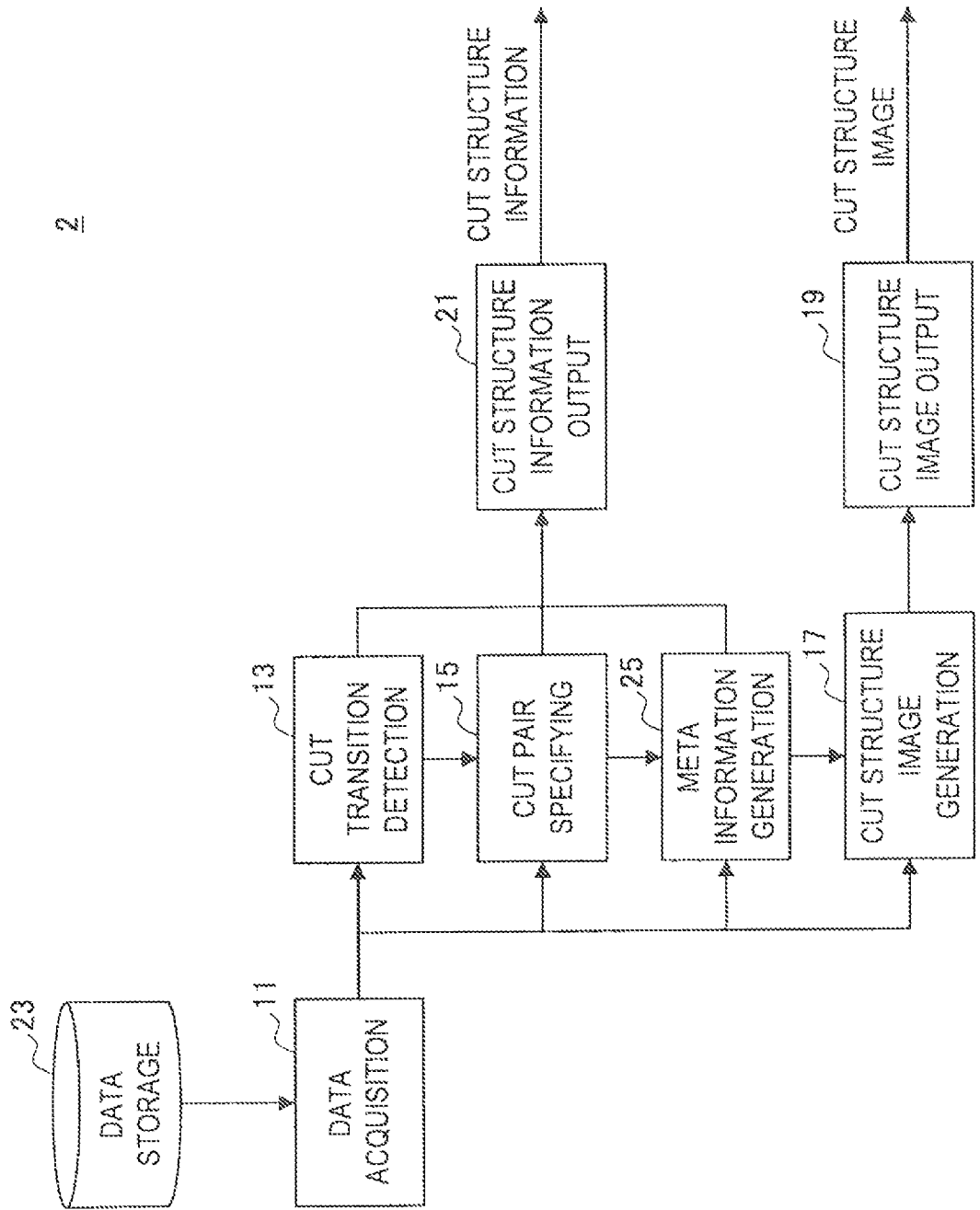
FIG. 10 is a block diagram illustrating the configuration of a moving image processing apparatus according to a second embodiment.

Next, the moving image processing apparatus 2 according to the second embodiment of the present disclosure will be described with reference to FIG. 10. Hereinafter, description overlapping the first embodiment will be omitted. FIG. 10 illustrates the main functional configuration of the moving image processing apparatus 2. As illustrated in FIG. 10, the moving image processing apparatus 2 includes a meta information generation unit 25, together with a data acquisition unit 11, a cut transition detection unit 13, a cut pair specifying unit 15, a cut structure image generation unit 17, a cut structure image output unit 19, a cut structure information output unit 21, and a data storage unit 23.

The meta information generation unit 25 generates meta information M (the general term for meta information) indicating the feature of the voice and the image included in each cut. The meta information generation unit 25 extracts the feature of voice and image from the moving image data MP based on the moving image data MP and the detection result of the cut transition. Then, the meta information M indicating the feature of the voice and the image of each cut is generated and supplied to the cut structure image generation unit 17.

Here, the meta information M may be stored in the data storage unit 23 as a part of cut structure information. In this way, the availability of the cut structure information is further improved AS data for performing a moving image search considering video expression.

The meta information M indicating the feature of the voice, for example, includes information indicating the content of voice (lines, sound effects and the like) included in each cut, information indicating that no voice is included in each cut (soundless cut) and the like. Furthermore, the meta information M may indicate a change in the feature of the voice included in each cut, or the difference between the feature of the voice included in one cut and the feature of the voice included in a similar cut belonging to a cut pair which is different from that of one cut.

The meta information M indicating the feature of the image, for example, includes information indicating, the number of frames included in each cut, information indicating the time necessary for the playback of each cut, and the like. Furthermore, the meta information M may indicate a change in the feature of the image included in each cut, or the difference between the features of images included in one cut and the features of images included in a similar cut belonging to a cut pair which is different from that of one cut.

The cut structure image generation unit 17 generates a cut structure image CI including the meta information M. The cut structure image CI is first generated as an image including representative images I of a plurality of cuts arranged in the order of cut transition and indicating the boundary between cut pairs, in the same manner as the first embodiment. In the second embodiment, the cut structure image CI is further generated as an image including the representative image I of each cut and meta information M indicating the features of the voice and the image included in each cut. In addition, the meta information M is generated as information including at least one of the features of the voice and the features of the images.

[3-2. Operation of Moving Image Processing Apparatus 2]

Next, the operation of the moving image processing apparatus 2 according to the second embodiment will be described with reference to FIGS. 11 to 15. Hereinafter, description overlapping the first embodiment will be omitted. Furthermore, the following description will be given on the assumption that the representative images I are arranged according to the layout illustrated in FIG. 7. However, the case in which the representative images I are arranged according to a different layout can be described in the same manner.

Figure 11:
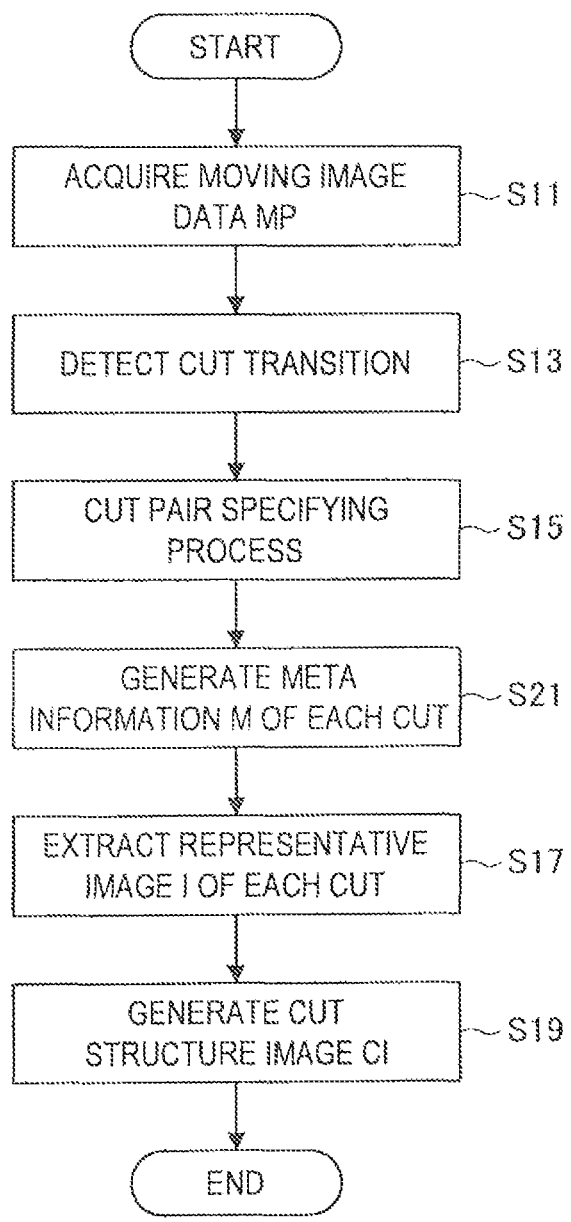
FIG. 11 is a flowchart illustrating, the operation procedure of a moving image processing apparatus.

FIG. 11 illustrates the operation procedure of the moving image processing apparatus 2. In steps S11, S13, S15 and S17, the same processes as those of the first embodiment are performed. When the cut pair specifying process ends, the process of step S21 is performed. The meta information generation unit 25 first extracts the features of the image and the voice included in each cut from moving image data MP based on the moving image data MP and the detection result of the cut transition.

For example, when voice (lines, sound effects and the like) is included in a cut, the voice included in the cut may be extracted, and character/image information corresponding to the extracted voice may be generated through voice recognition processing and the like. When no voice is included in the cut, character/image information indicating that the cut is a soundless cut may be generated. In addition, the soundless cut may be distinguished as a soundless cut including no lines or a soundless cut including neither lines nor sound effects. Character/image information, which indicates an average value/a change value, of the volume of voice included in a cut, the ratio of a soundless section and a sound section, or tone/rhythm or a change of the voice, may be generated.

Furthermore, the number of frames included in a cut or time necessary for playing back the cut may be calculated, and then character/image information indicating the calculation value may be generated. Character/image information, which indicates an average value/a change value of the brightness of images included, in the cut, or the content and the like or a change of the images, may be generated.

After the meta information M is generated, in the same manner as the first embodiment, the representative image I of each cut are extracted from the moving image data MP based on the moving image data MP and the detection result of the cut transition (step S17), and the cut structure image CI including, the meta information M is generated (step S19) based on the specifying result of the cut pairs.

Here, the meta information M may or may not be superimposed on the representative image I. When the meta information M is superimposed on the representative image I, the meta information M may be superimposed on an area where no specific image (a facial image and the like) is displayed through image recognition processing and the like of the representative image I. Furthermore, when displaying lines of a cut including a plurality of speakers, the lines may be displayed to correspond to each speaker by taking the sex, age and the like of the speakers into consideration.

Figure 12:
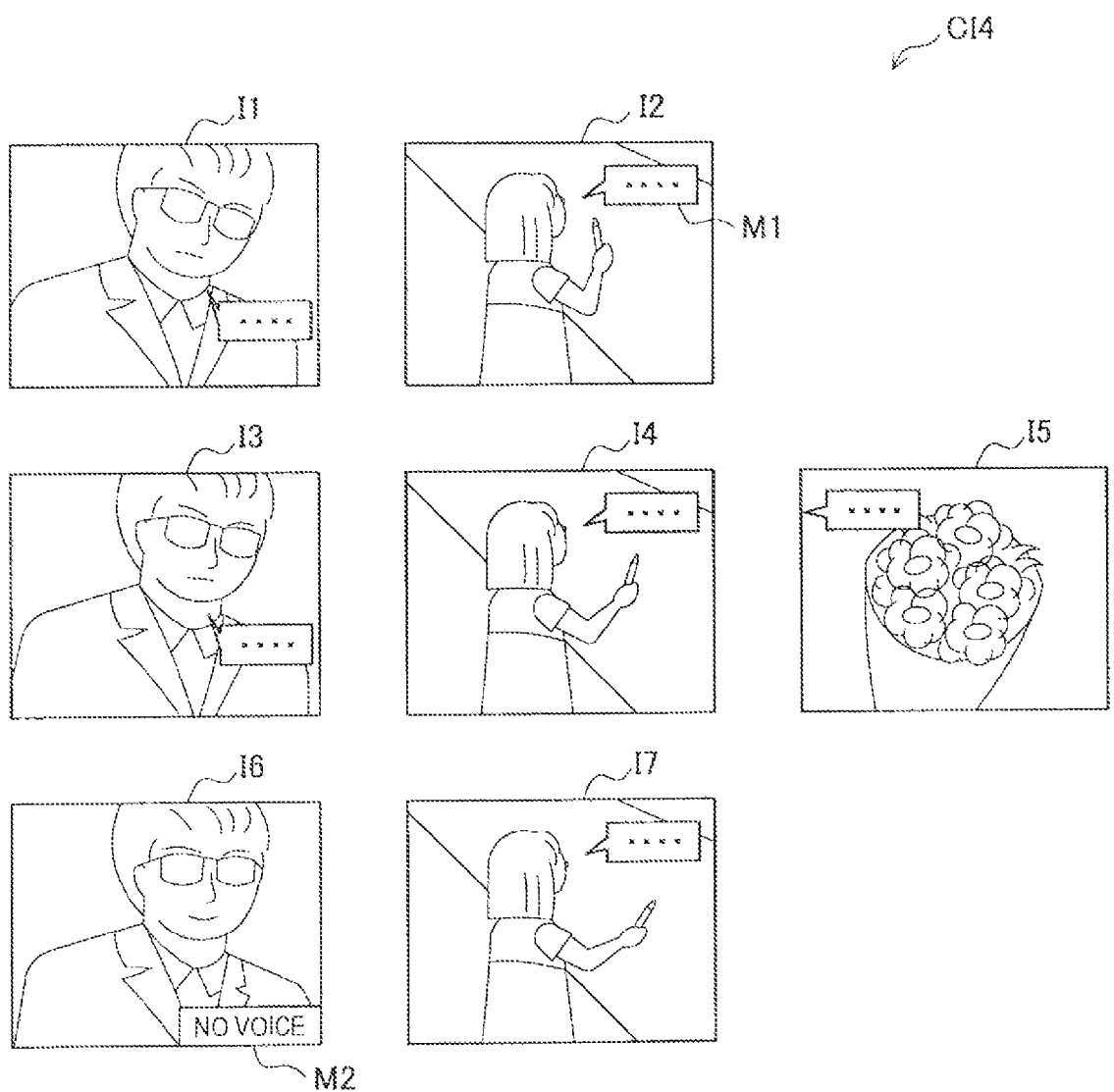
FIG. 12 is a diagram illustrating an example of a cut structure image including meta information indicating features of voice of a cuts.

FIG. 12 illustrates an example of a cut structure image CI including meta information M indicating the feature of voice of each cut. In the cut structure image CI4 illustrated in FIG. 12, a balloon M1 including lines of each cut is displayed on cuts 1 to 5 and 7, and a mark M2 ("NO VOICE") indicating, a soundless cut is displayed on a cut 6.

In this way, it is possible to estimate images included in the cuts 1 to 5 and 7 from the content of the lines. Specifically, when using an image including the mouth of a speaker as a material of other images and the like, even if all images included in the cuts are not checked, it possible to estimate the image included in the cut from the meta information M1 and M2. Furthermore, since the cut 6 is a soundless cut unlike the cuts 1 and 3 belonging to the same cut group, it is possible to estimate the cut 6 as a special cut of the cut structure.

Figure 13:
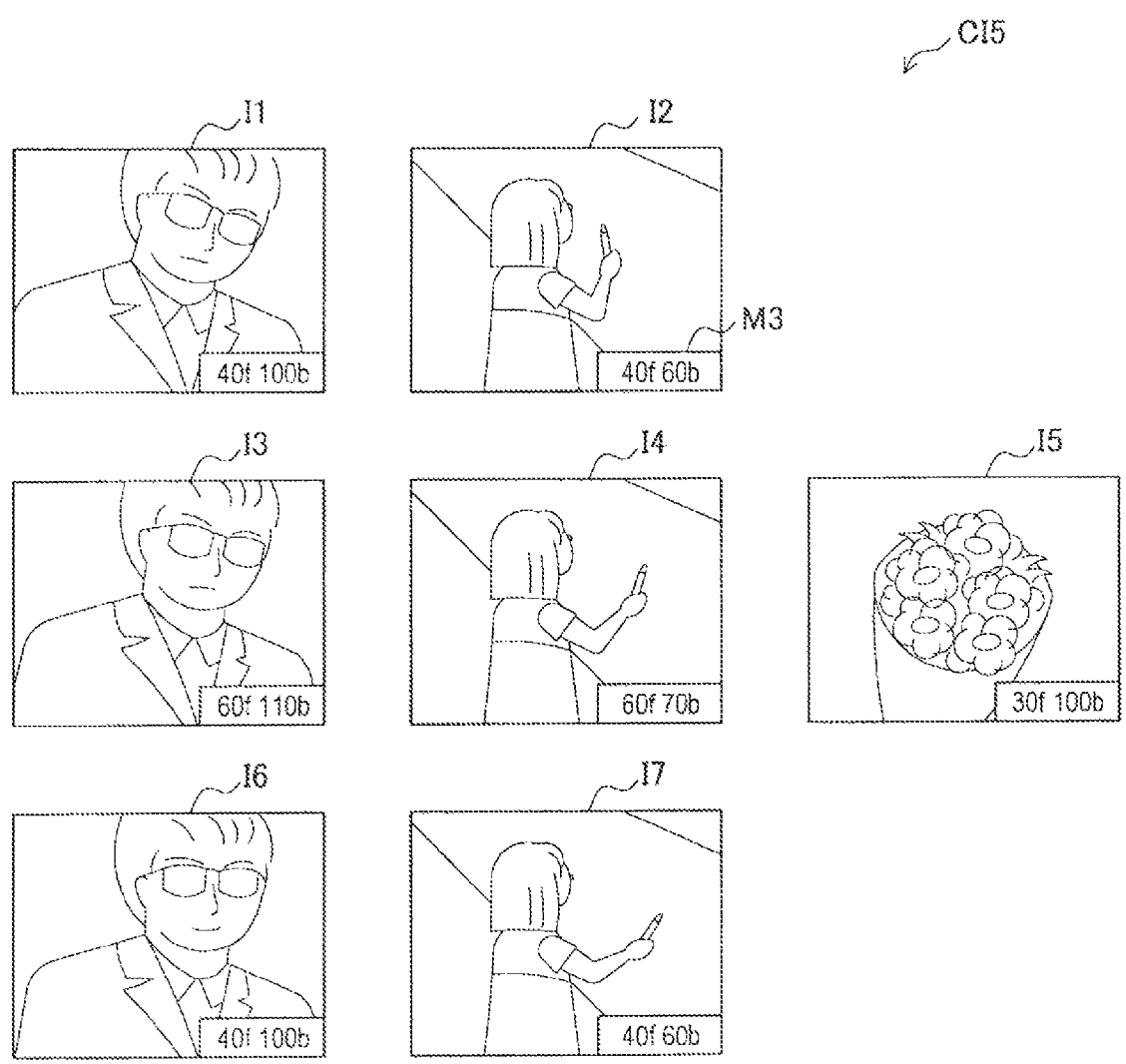
FIG. 13 is a diagram illustrating an example of a cut structure image including meta information indicating features of images of cuts.

FIG. 13 illustrates an example of a cut structure image CI including meta, information M indicating the feature of an image of each cut. In the cut structure image CI5 illustrated in FIG. 13, character/image information M3, which indicates the number ("40f" and the like) of frames of each cut and an average value ("100b" and the like) of the brightness of images, is displayed on cuts 1 to 7.

In this way, it is possible to easily understand the amount and brightness of images included in the cuts 1 to 7. Specifically, when using an image with specific brightness as a material, even if all images included in the cuts are not checked, it is possible to estimate the brightness of images included in the cuts from the meta information M3. Furthermore, since the cuts 3 and 4 have a large amount of images as compared with the cuts 1 and 6 and the cuts 2 and 7, which belong to the same cut group, it is possible to estimate the cuts. 3 and 4 as special cuts of the cut structure from the meta information M3.

Figure 14:
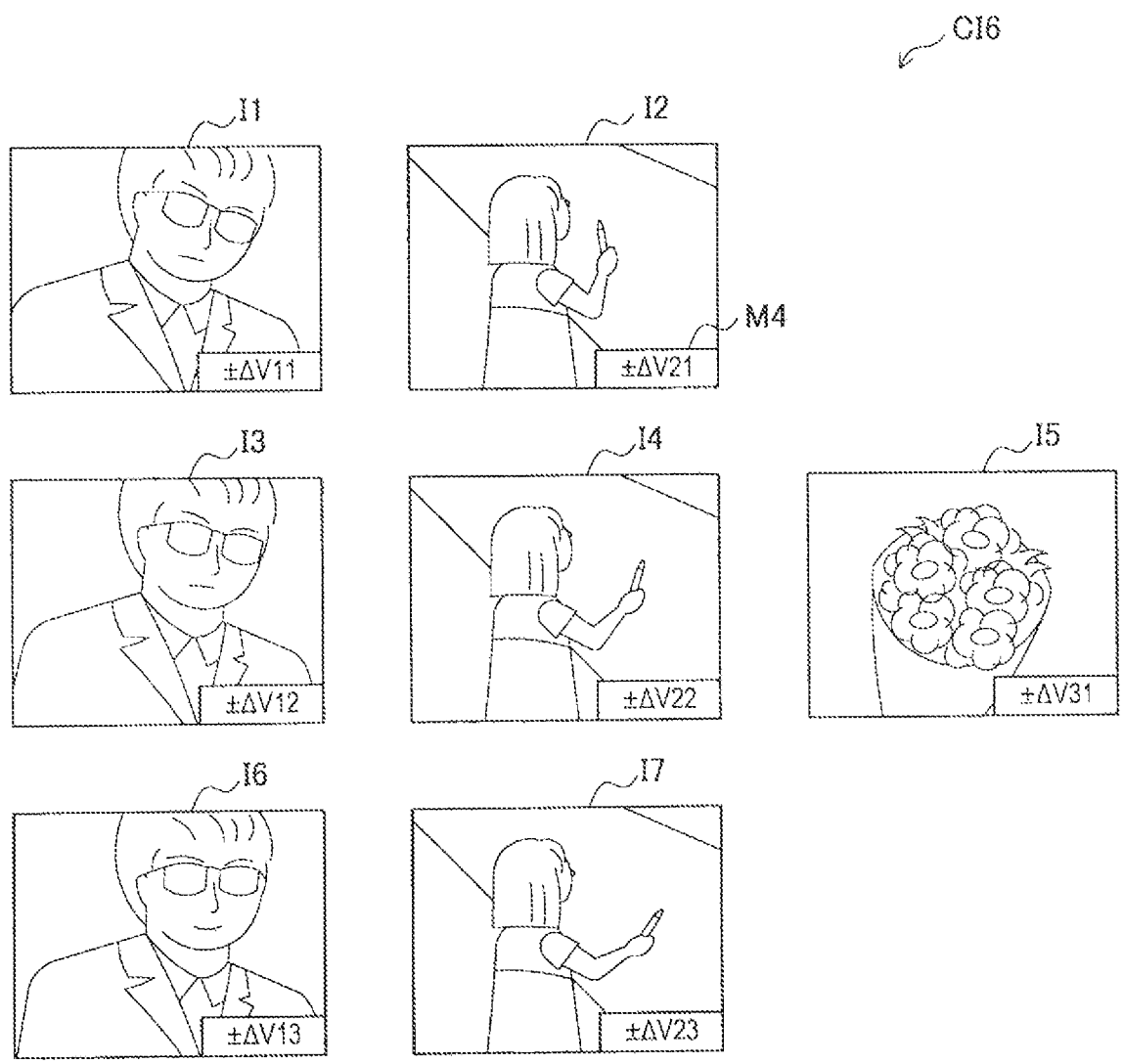
FIG. 14 is a diagram illustrating an example of a cut structure image including meta information indicating a change in the features of cuts.

FIG. 14 illustrates an example of a cut structure image CI including meta information M indicating a change in the feature of voice of each cut. In the cut structure image CI6 illustrated in FIG. 14, character/image information M4, which indicates a change value ("±ΔV11" and the like) of the volume of the voice included in each cut, is displayed on cuts 1 to 7. In addition, the change value of the volume is displayed as a variation for an average value of the volume of the voice included in each cut.

In this way, it is possible to estimate the volume of the voice included in the cuts 1 to 7. Specifically, when using an image including voice with specific volume as a material, even if all images included in the cuts are not checked, it is possible to easily find the image including the voice with the specific volume from the meta information M4.

Furthermore, the meta information M is not limited to information indicating the features of the voice and the image included in each cut, and may be generated as information indicating the difference relative to the features of voice and images included in a similar cut belonging to the same cut group.

Figure 15:
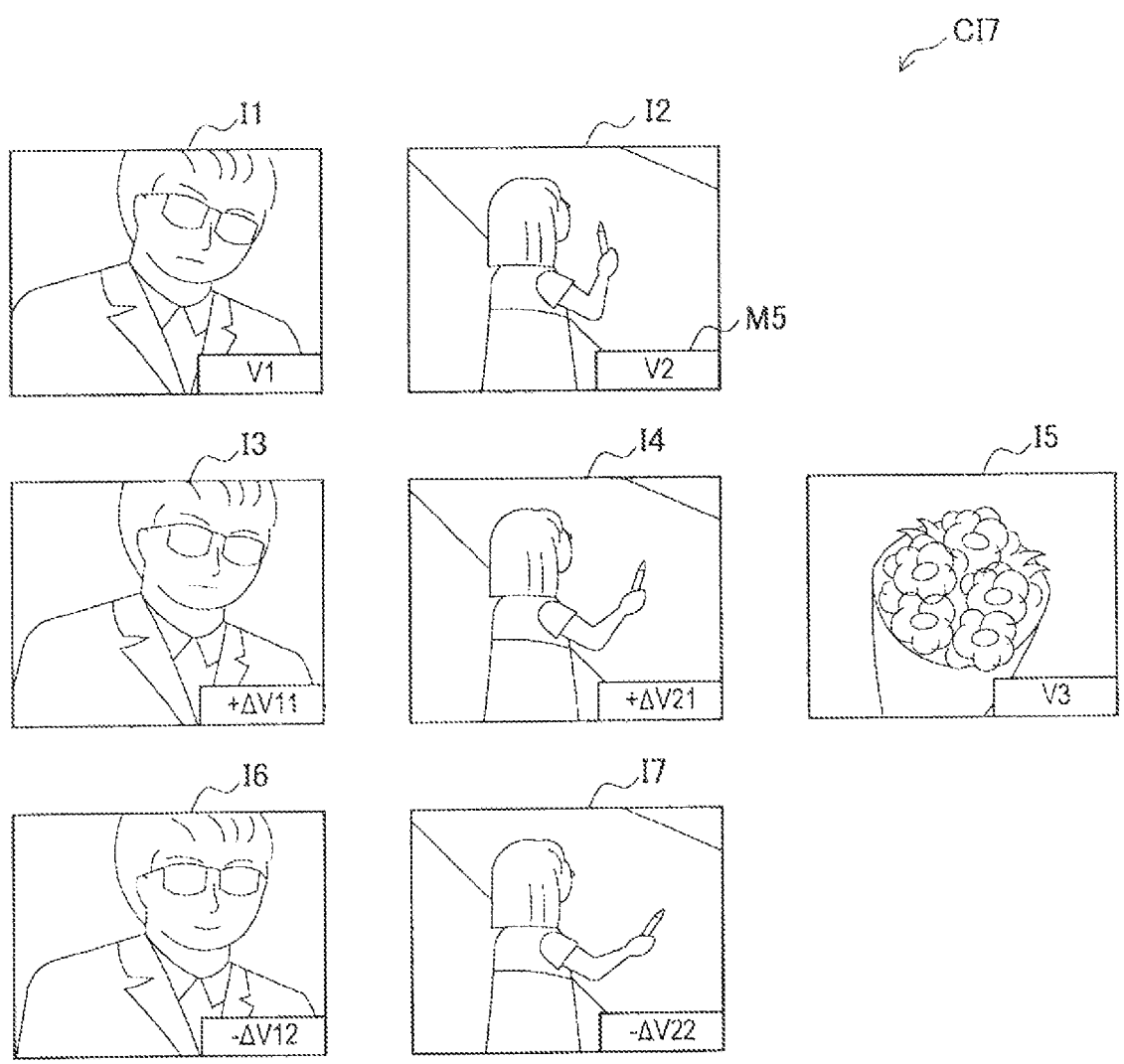
FIG. 15 is a diagram illustrating an example of a cut structure image including meta information indicating a difference in the features of cuts between similar cuts.

FIG. 15 illustrates an example of a cut structure image CI including meta information M indicating the difference in the features of images of cuts, between similar cuts. In the cut structure image CI7 illustrated in FIG. 15, character/image information M5, which indicates, the difference (±ΔV11, −ΔV12, +ΔV21 and −ΔV22) in the amount of a change in, the content of images included in cuts 3 and 6 and cuts 4 and 7, which belong to the same cut group, is displayed by employing the amount (V1 and V2) of a change in the content of images included in cuts 1 and 2 as a reference. In addition, the amount of the change in the content of the images, for example, is obtained based on the number/size of movement vectors indicating the movement of a feature point in frames in succession.

In this way, it is possible to easily understand the amount of a change in the images included in the cuts 1 to 7. Specifically, when using plurality of images with some motion as a material of other images and the like, even if all cuts belonging to a cut group are not checked, it is possible to easily find the plurality of images with some motion from the amount of a change in the content of the images based on the meta information M5.

[3-3. Conclusion]

As described above, in accordance with the moving, image processing apparatus 2 according to the second embodiment of the present disclosure, detailed information on a method of expressing a video in relation to the temporal context of the video is provided using the cut structure image CI including meta information M indicating the feature, of each cut. Consequently, a viewer or a user of the video views the video or uses the video as a material of other videos and the like, thereby easily understanding the cut structure of the video.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2010-179694 filed in the Japan Patent Office on Aug. 10, 2010, the entire content of which is hereby incorporated by reference.

What is claimed is:

1. A moving image processing apparatus comprising:
   one or more processors operable to:
      detect inter-cut transition from a moving image of a video including a plurality of cuts;
      assign group identifiers (IDs) and a first pair ID to a first cut and a second cut of the plurality of cuts of the moving image of the video,
         wherein each of the assigned group IDs represents a cut group of one or more of the plurality of cuts based on a degree of similarity between one or more feature amounts of frames of the moving image, and
         wherein the assigned first pair ID represents a cut pair specifying a repeated series of different cuts;
      assign a new group ID and the first pair ID to a subsequent cut of the moving image when a degree of similarity between one or more feature amounts of the subsequent cut and the cut group is below a threshold;
      assign one of the assigned group IDs and a second pair ID to the subsequent cut of the moving image when the degree of similarity between the one or more feature amounts of the subsequent cut and the cut group is higher than or equal to the threshold; and
      generate a cut structure image of one or more cut pairs, wherein representative images of each of the one or more cut pairs are arranged in an order of the inter-cut transition, and indicating a boundary between the one or more cut pairs.

2. The moving image processing apparatus according to claim 1, wherein the cut structure image includes meta information indicating a feature of each cut.

3. The moving image processing apparatus according to claim 2, wherein the meta information indicates a feature of voice included in each cut.

4. The moving image processing apparatus according to claim 3, wherein the meta information indicates content of voice included in each cut.

5. The moving image processing apparatus according to claim 3, wherein the meta information indicates that no voice is included in each cut.

6. The moving image processing apparatus according to claim 3, wherein the meta information indicates a change in the feature of the voice included in each cut.

7. The moving image processing apparatus according to claim 3, wherein the meta information indicates a difference between a feature of voice included in one cut and a feature of voice included in a similar cut belonging to the cut pair which is different from the one cut.

8. The moving image processing apparatus according to claim 2, wherein the meta information indicates a feature of an image included in each cut.

9. The moving image processing apparatus according to claim 8, wherein the meta information indicates the number of frames included in each cut.

10. The moving image processing apparatus according to claim 8, wherein the meta information indicates a change in the feature of the image included in each cut.

11. The moving image processing apparatus according to claim 8, wherein the meta information indicates a difference between a feature of an image included in one cut and a feature of an image included in a similar cut belonging to the cut pair which is different from the one cut.

12. The moving image processing apparatus according to claim 2, wherein the meta information is superimposed on the representative image of each cut.

13. The moving image processing apparatus according to claim 12, wherein the meta information is superimposed on an area where no specific image is displayed among areas of the representative images.

14. The moving image processing apparatus according to claim 1, wherein the cut structure image indicates the boundary between the one or more cut pairs through line feed of a display position.

15. The moving image processing apparatus according to claim 14, wherein the cut structure image shows the representative image of each cut to be aligned with a display position of the representative image of a similar cut belonging to the cut pair which is different from the cut.

16. A moving image processing method comprising the steps of:
   in an image processing apparatus comprising one or more processors:
      detecting inter-cut transition from a moving image of a video including a plurality of cuts;
      assigning group identifiers (IDs) and a first pair ID to a first cut and a second cut of the plurality of cuts of the moving image of the video,
         wherein each of the assigned group IDs represents a cut group of one or more of the plurality of cuts based on a degree of similarity between one or more feature amounts of frames of the moving image, and
         wherein the assigned first pair ID represents a cut pair specifying a repeated series of different cuts;
      assigning a new group ID and the first pair ID to a subsequent cut of the moving image when a degree of similarity between one or more feature amounts of the subsequent cut and the cut group is below a threshold;
      assigning one of the assigned group IDs and a second pair ID to the subsequent cut of the moving image when the degree of similarity between the one or more feature amounts of the subsequent cut and the cut group is higher than or equal to the threshold; and generating a cut structure image of one or more cut pairs wherein representative images of each of the one or more cut pairs are arranged in an order of the inter-cut transition and indicating a boundary between the one or more cut pairs.

17. A non-transitory computer-readable storage medium having stored thereon, a program having at least one code section, the at least one code section being executable by a processing unit for causing a moving image processing apparatus to perform steps comprising:

detecting inter-cut transition from a moving image of a video including a plurality of cuts;

assigning group identifiers (IDs) and a first pair ID to a first cut and a second cut of the plurality of cuts of the moving image of the video, wherein each of the assigned group IDs represents a cut group of one or more of the plurality of cuts based on a degree of similarity between one or more feature amounts of frames of the moving image, and wherein the assigned first pair ID represents a cut pair specifying a repeated series of different cuts;

assigning a new group ID and the first pair ID to a subsequent cut of the moving image when a degree of similarity between one or more feature amounts of the subsequent cut and the cut group is below a threshold;

assigning one of the assigned group IDs and a second pair ID to the subsequent cut of the moving image when the degree of similarity between the one or more feature amounts of the subsequent cut and the cut group is higher than or equal to the threshold; and generating a cut structure image of one or more cut pairs wherein representative images of each of the one or more cut pairs are arranged in an order of the inter-cut transition and indicating a boundary between the one or more cut pairs.

18. The moving image processing apparatus according to claim 1, wherein the feature amount of each cut is calculated as at least one of: a color histogram, facial image, volume of voice and tone of voice.

19. The moving image processing apparatus according to claim 1, wherein representative images of each of the plurality of cuts are equal in size in the cut structure image.

20. The moving image processing apparatus according to claim 1, wherein sizes of the representative images are adjusted such that display widths of the one or more cut pairs coincide with each other.

* * * * *